(12) United States Patent
Simpson et al.

(10) Patent No.: US 10,827,664 B2
(45) Date of Patent: Nov. 10, 2020

(54) MOWER DECK LIFTING RAMPS

(71) Applicant: DEERE & COMPANY, Moline, IL (US)

(72) Inventors: Robert Simpson, North Augusta, SC (US); Samuel Gantt, Grovetown, GA (US); Giovanni Santoro, North Augusta, SC (US); Rishika Shekhawat, Pune (IN)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 16/286,238

(22) Filed: Feb. 26, 2019

(65) Prior Publication Data

US 2020/0267886 A1 Aug. 27, 2020

(51) Int. Cl.
| | |
|---|---|
| *A01B 63/104* | (2006.01) |
| *A01D 34/00* | (2006.01) |
| *A01D 34/66* | (2006.01) |
| *A01D 69/00* | (2006.01) |
| A01D 34/74 | (2006.01) |
| A01D 34/64 | (2006.01) |
| A01D 101/00 | (2006.01) |

(52) U.S. Cl.
CPC .......... *A01B 63/104* (2013.01); *A01D 34/001* (2013.01); *A01D 34/661* (2013.01); *A01D 69/002* (2013.01); A01D 34/74 (2013.01); A01D 2034/645 (2013.01); A01D 2101/00 (2013.01)

(58) Field of Classification Search
CPC ................ A01B 63/104; A01D 34/001; A01D 2034/645; A01D 34/81; A01D 34/64
See application file for complete search history.

(56) References Cited

U.S. PATENT DOCUMENTS

| | | |
|---|---|---|
| 4,307,561 A | 12/1981 | Hicks |
| 4,441,306 A | 4/1984 | Kuhn |
| 4,563,019 A | 1/1986 | Kuhn et al. |
| 4,779,406 A | 10/1988 | Schroeder |
| 5,244,047 A * | 9/1993 | Eudy .................... A01B 59/006 172/275 |
| 5,252,022 A | 10/1993 | Culp et al. |
| 5,927,055 A | 7/1999 | Ferree et al. |
| 6,347,503 B1 | 2/2002 | Esau et al. |
| 6,874,308 B1 | 4/2005 | Bartel |
| 7,028,456 B2 | 4/2006 | Thatcher et al. |
| 7,240,470 B2 | 7/2007 | Clement et al. |

(Continued)

FOREIGN PATENT DOCUMENTS

| | | |
|---|---|---|
| DE | 102015206923 A1 | 10/2015 |
| EP | 3106014 B1 | 5/2018 |

OTHER PUBLICATIONS

European Search Report issued in counterpart application No. 20158452.1 dated Jul. 16, 2020 (09 pages).

*Primary Examiner* — Robert E Pezzuto
*Assistant Examiner* — Madeline Ivy Runco

(57) ABSTRACT

A pair of mower deck lifting ramps are mounted to a top surface of a mower deck for supporting a pair of tractor tires to ride over belts and pulleys on one side of the deck. A first carrier engagement member and a second carrier engagement member are attached to each drive-over ramp. The first and second carrier engagement members engage the upper and lower parts of a carrier attached to a lift arm of a loader to raise and turn the mower deck.

15 Claims, 4 Drawing Sheets

(56) References Cited

U.S. PATENT DOCUMENTS

| | | | |
|---|---|---|---|
| 7,347,037 B2 | 3/2008 | Sundberg et al. | |
| 7,481,036 B2 | 1/2009 | Lilliestielke et al. | |
| 7,610,739 B2 | 11/2009 | Godfrey | |
| 7,685,800 B2 | 3/2010 | Sugio et al. | |
| 7,870,710 B2 * | 1/2011 | Koehn | A01D 34/74 |
| | | | 56/15.9 |
| 7,877,972 B2 | 2/2011 | Fox et al. | |
| 7,905,297 B2 | 3/2011 | Fox et al. | |
| 8,234,847 B2 | 8/2012 | Fox et al. | |
| 8,336,281 B2 | 12/2012 | Sugio et al. | |
| 8,720,173 B2 | 5/2014 | Sugio et al. | |
| 9,622,406 B2 | 4/2017 | Tada et al. | |
| 9,642,297 B2 * | 5/2017 | Nordquist | A01D 34/662 |
| 9,699,962 B2 * | 7/2017 | Akita | A01D 34/661 |
| 9,884,731 B2 * | 2/2018 | Wilcox | B60P 1/433 |
| 2009/0077939 A1 * | 3/2009 | Fox | A01B 71/06 |
| | | | 56/15.6 |
| 2011/0099963 A1 | 5/2011 | Fox et al. | |
| 2015/0181796 A1 * | 7/2015 | Nordquist | A01D 42/06 |
| | | | 37/243 |
| 2016/0183454 A1 | 6/2016 | Akita et al. | |
| 2017/0089029 A1 * | 3/2017 | Esqueda | E02F 3/34 |

* cited by examiner

MOWER DECK LIFTING RAMPS

FIELD OF THE INVENTION

This invention relates generally to mower decks carried by tractors and utility vehicles for agricultural work and lawn care, and particularly to lifting and transporting a mower deck while the deck is not in use.

BACKGROUND OF THE INVENTION

Tractors and utility vehicles used for agricultural work and lawn care may carry a mower deck covering two or more rotary cutting blades on the lower ends of vertically oriented spindles. While in use, the mower deck may be attached to a tractor or other vehicle with mechanical linkages that allow the deck to operate at a range of different cutting heights, and raised or lowered between each height. The blade spindles may be rotated by one or more belts and pulleys above the top surface of the deck, which may be driven by an engine and/or power take off shaft. The deck perimeter may have several anti-scalp wheels and/or caster wheels, also referred to as gauge wheels.

Mid-mounted mower decks may be attached to and/or suspended from the frame of a tractor or utility vehicle at a position between the front and rear wheels. Often it may be desirable to remove the mower deck in order to service the unit or store it while using other implements. Some mower decks have drive-over ramps which may be used to help attach or remove a mid-mounted mower deck from the tractor or vehicle. For example, U.S. Pat. Nos. 7,240,470, 7,877,972, 7,905,297 and 8,234,847 drive over mower decks. However, a mower deck may be cumbersome to lift and move after it is disconnected from its mounting position under the tractor or vehicle. Additionally, a mower deck may weigh several hundred pounds and may be difficult to carry and handle. As a result, a hoist or some other lifting attachment may be required to lift and maneuver a mower deck into a desired position.

U.S. Pat. No. 7,347,037 relates to a transport system and apparatus for a mower deck having transport brackets welded onto the top surface of the mower deck. Pins extend through at least one hole in the plates and are secured to a rear mounted hitch of a tractor. The mower deck may be lifted and transported in a raised position behind the tractor, and also may be pivoted to a position for servicing. However, the system requires positioning the mower deck behind the tractor and aligning the plates with the rear hitch.

U.S. Pat. Nos. 6,347,503 and 7,028,456 are two examples of flip-up mowing decks that may position a mower deck between an operating position, and a storage/cleaning position. However, flip-up mowing decks can be difficult to transport and store.

A mower deck is needed that can be lifted and transported without a hoist or another lifting attachment. A transport system is needed to lift and carry a mower deck in front of the tractor or other vehicle. A mower deck transport method is needed to quickly and easily lift and carry a mower deck.

SUMMARY OF THE INVENTION

A pair of mower deck lifting ramps on the top surface of a mower deck. Each mower deck lifting ramp includes a rear facing hook on a front mounting portion and a tapered pin on a rear mounting portion. Each of the rear facing hooks and tapered pins are engageable with a carrier on a forward end of one of a pair of lift arms of a front loader.

DESCRIPTION OF THE PREFERRED EMBODIMENT

Figure 1:
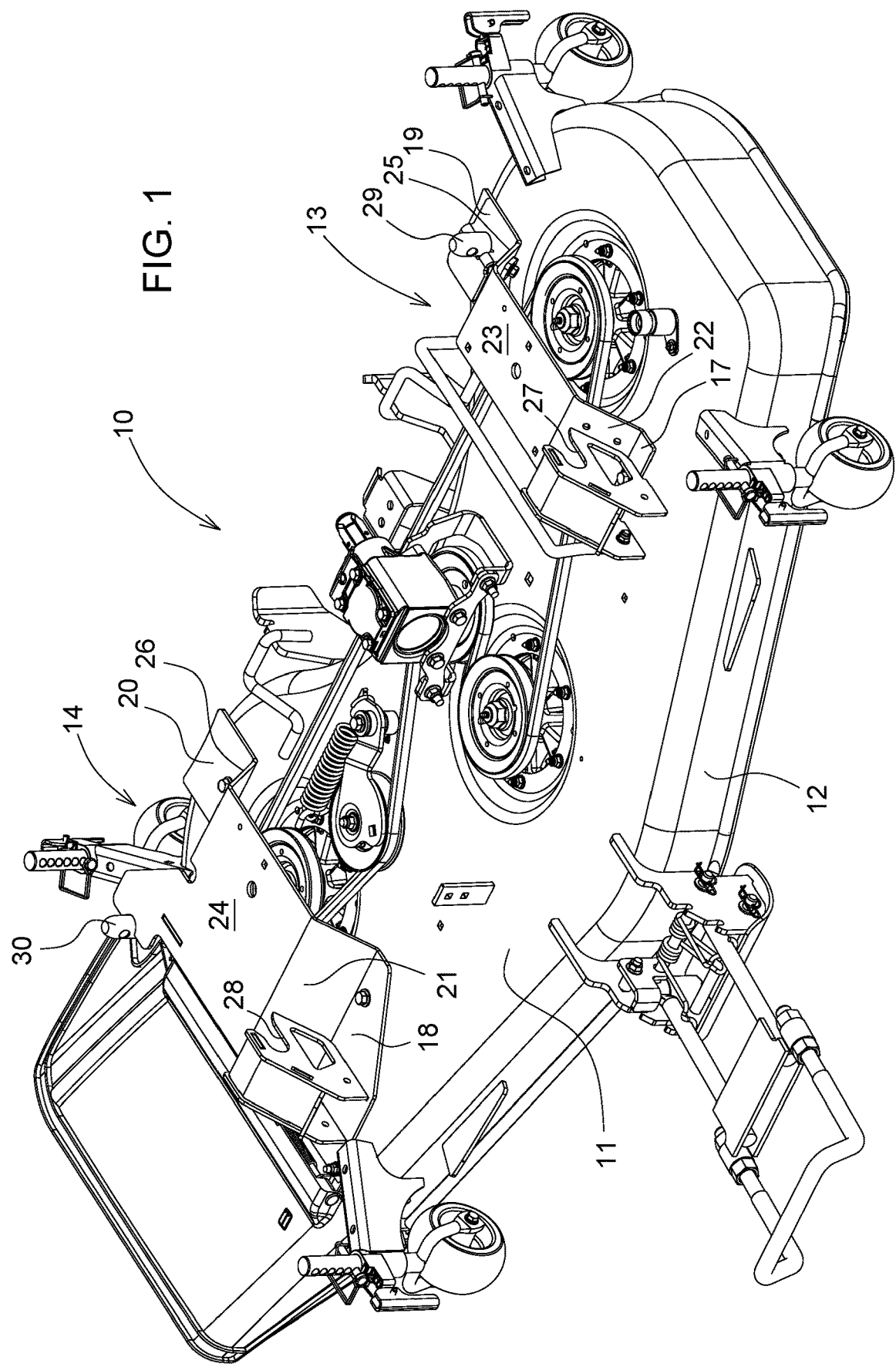
FIG. 1 is a top perspective view of a mower deck with a pair of mower deck lifting ramps according to a first embodiment of the invention.

In one embodiment, as shown in FIG. 1, mower deck 10 may cover a plurality of rotary cutting blades mounted on the lower ends of vertically oriented spindles. The mower deck may have a top surface 11, a front facing edge 12 with a rim extending downwardly from the top surface, left and right sides and a back edge. During mowing, the mower deck may be mid-mounted under a tractor or vehicle frame between the tractor or other vehicle's front and rear wheels. Mower deck 10 may have a pair of mower deck lifting ramps 13, 14 mounted on the top surface of the deck.

In one embodiment, each mower deck lifting ramp 13, 14 may provide a shield for belts and pulleys that rotate two or more rotary mower blades attached to spindles connected to a power take off shaft and gear box to drive the blades. Each mower deck lifting ramp may provide a bridge or ramp for the tractor tires to ride over the belts and pulleys on one side of the deck. Preferably, a pair of mower deck lifting ramps may be mounted on the top surface of the mower deck, although a single ramp may be used, that may be wide enough to accommodate the left and right tires of a tractor.

Figure 2:
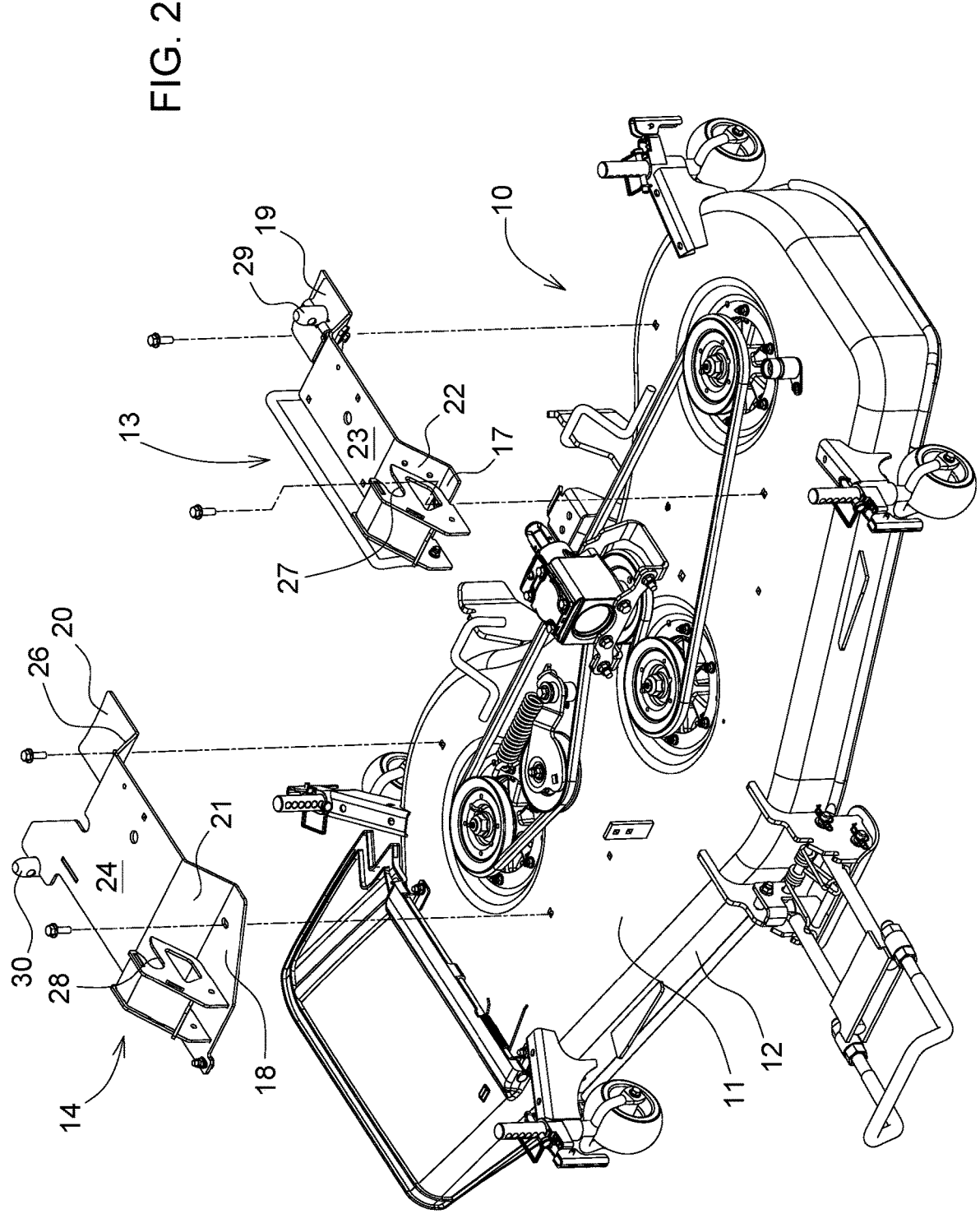
FIG. 2 is an exploded view of a mower deck with a pair of mower deck lifting ramps according to a first embodiment of the invention.

As shown in FIGS. 1 and 2, each of the pair of mower deck lifting ramps may be mounted to the top surface 11 of the deck in a position that protects working components of the deck from the weight of the tractor, including the tractor front tires (or rear tires) while driving over the deck. For example, each lifting ramp may have a front mounting portion 17, 18 attached to the top of the mower deck by threaded fasteners or other means in front of the spindles and belts, and a rear mounting portion 19, 20 attached to the top of the mower deck in back of the spindles and belts. The front and rear mounting portions may be attached to the top surface of the deck with threaded fasteners, rivets or other attachment devices. Each mower deck lifting ramp also may include a front sloping surface 21, 22 sloping upwardly from the front mounting portions 17, 18 to the center portion 23, 24 of the lifting ramp, and a rear sloping surface 25, 26 sloping upwardly from the rear mounting portions 19, 20 to the center portion 23, 24 of the lifting ramp.

Figure 3:
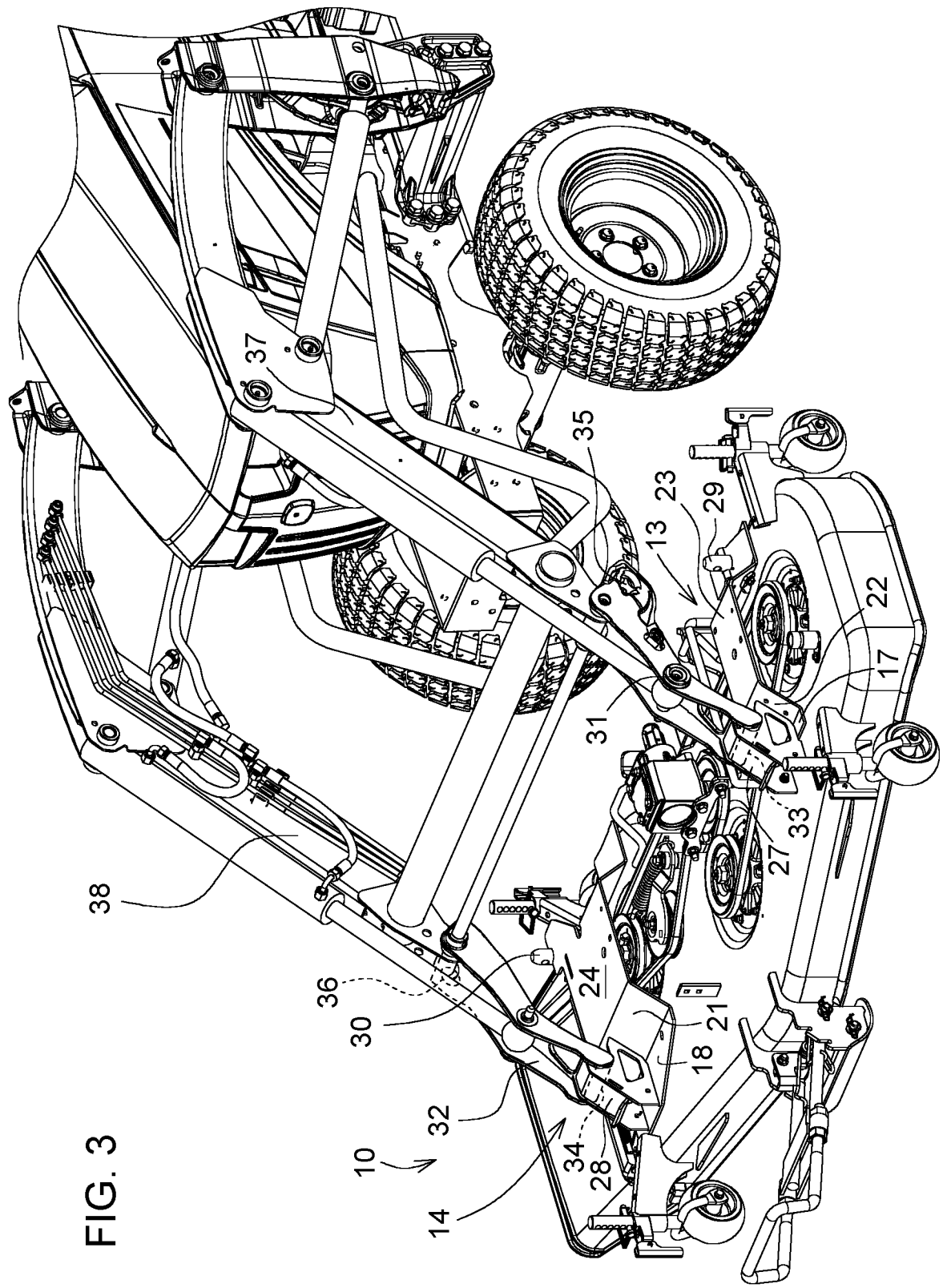
FIG. 3 is a perspective view of a compact utility tractor with a front loader attachment lifting a mower deck using a pair of mower deck lifting ramps according to a first embodiment of the invention.
Figure 4:
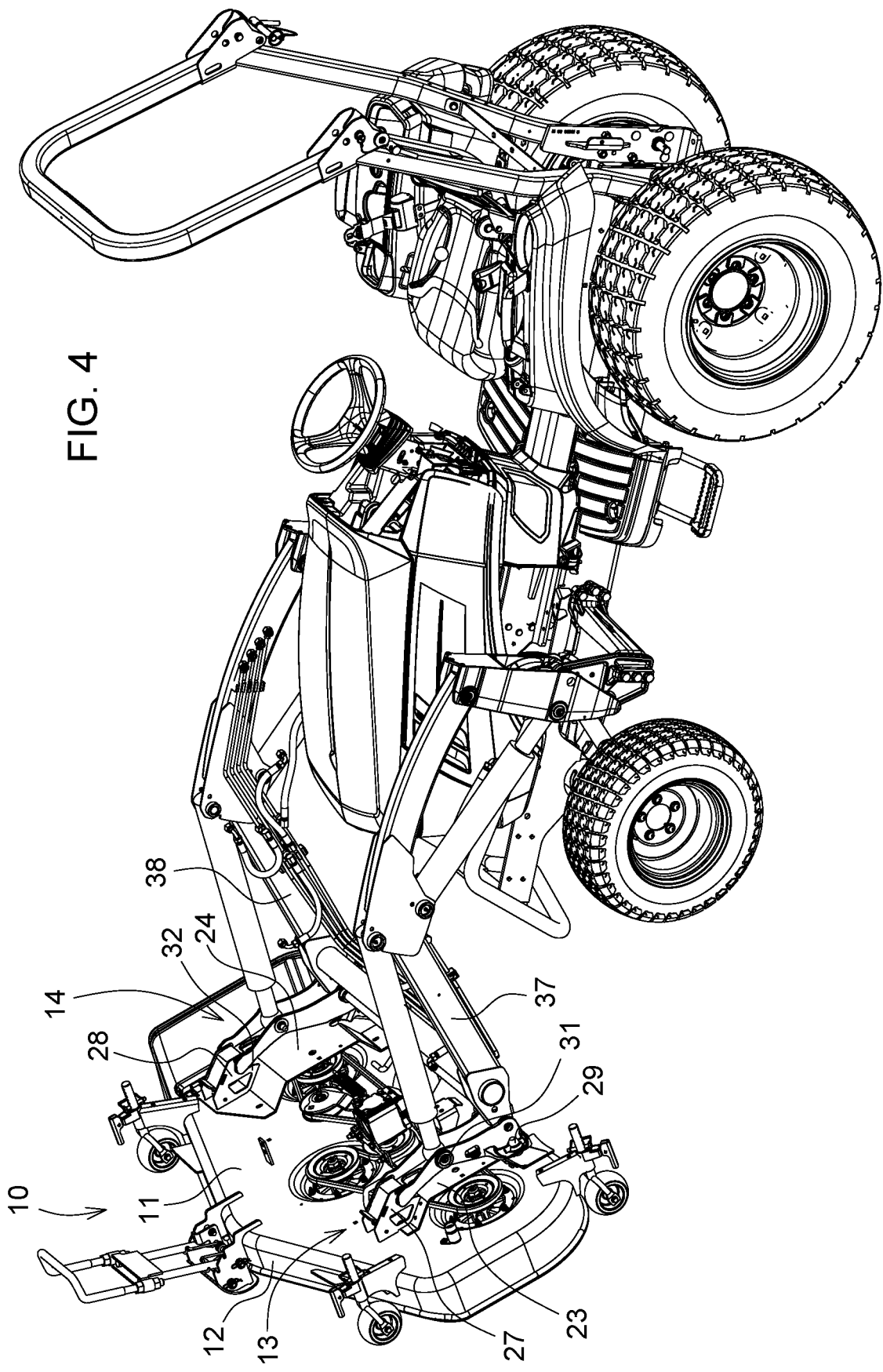
FIG. 4 is a perspective view of a compact utility tractor with a front loader attachment carrying a mower deck using a pair of mower deck lifting ramps according to a first embodiment of the invention.

In one embodiment, each mower deck lifting ramp may have a first carrier engagement member such as a rear-facing hook 27, 28, and a second carrier engagement member such as a tapered pin 29, 30. Each carrier engagement member such as hook 27, 28 may be welded or otherwise secured to the front mounting portion 17, 18 and/or the front sloping surface 21, 22 of the mower deck lifting ramp. Each hook 27, 28 may have an opening at about the same height above the mower deck as the center portion of the lifting ramp. As shown in FIGS. 3 and 4, a tractor having a front loader attachment may pick up and carry or transport the mower deck using the engagement members on the pair of mower deck lifting ramps. The front loader attachment may include a pair of hitch members or carriers 31, 32 pivotably mounted to a forward end of one of a pair of lift arms 37, 38. Each of the first carrier engagement members such as hooks 27, 28 may be engageable with the hitch member or carrier on the forward end of one of the lift arms. For example, a connector rod 33, 34 may be on an upper end of each hitch member or carrier. The tractor operator may move the tractor lift arms to position connector rods 33, 34 on the upper ends of the hitch members or carriers into hooks 27, 28 until the rods are fully engaged in the hooks. The operator then may raise the pair of lift arms, lifting the front of the mower deck. Once the mower deck is raised off the ground, the mower deck may pivot so that the rear of the mower deck moves toward the hitch members or carriers. The second carrier engagement members, which may be tapered pins 29, 30, may be positioned on a rear mounting portion of each of the pair of drive-over ramps attached to the top surface of the mower deck. Each of the second carrier engagement members such as tapered pins 29, 30 may be engageable with a carrier on a forward end of one of a pair of lift arms. For example, each of tapered pins may enter a mounting hole 35, 36 on the lower portion of each hitch member or carrier.

In one embodiment, the pair of mower deck lifting ramps having first and second carrier engagement members may be used to lift, turn and transport a mower deck to a storage location where the mower deck may be stored in an upright or vertical position or attached to a supporting rack. Additionally, mower deck lifting ramps allow the underside of the mower deck including blades to be serviced while it is held and turned using carriers on lift arms of a front end loader.

Having described the preferred embodiment, it will become apparent that various modifications can be made without departing from the scope of the invention as defined in the accompanying claims.

We claim:

1. A pair of mower deck lifting ramps comprising:
   a pair of rear facing hooks, each hook on a front mounting portion of one of a pair of tire supporting members shielding a top surface of a mower deck;
   a pair of tapered pins, each tapered pin on a rear mounting portion of one of the pair of tire supporting members shielding the top surface of the mower deck;
   each of the rear facing hooks and tapered pins engageable with a carrier on a forward end of one of a pair of lift arms of a front loader.

2. The pair of mower deck lifting ramps of claim 1 wherein each of the pair of rear facing hooks is engageable with a connector rod on the carrier.

3. The pair of mower deck lifting ramps of claim 1 wherein each of the tapered pins is engageable with a mounting hole on the carrier.

4. The pair of mower deck lifting ramps of claim 1 wherein the rear facing hooks are engageable with the carrier before the tapered pins.

5. The pair of mower deck lifting ramps of claim 1 further comprising an upward sloping surface between each of the front and rear mounting portions and a center portion of the tire supporting members.

6. A pair of mower deck lifting ramps comprising:
   a first carrier engagement member and a second carrier engagement member on each of a pair of tire supporting members shielding a top surface of a mower deck;
   each of the first carrier engagement member and the second carrier engagement member being engageable by a carrier on a forward end of a lift arm of a loader which may raise the mower deck to an upright position.

7. The pair of mower deck lifting ramps of claim 6 wherein the first attachment member is a rear facing hook.

8. The pair or mower deck lifting ramps of claim 6 wherein the second attachment member is a tapered pin.

9. The pair of mower deck lifting ramps of claim 6 wherein the mower deck is pivotable on the first attachment member to an upright position when engaged by the carrier.

10. The pair of mower deck lifting ramps of claim 6 comprising at least one sloped surface on each of the tire supporting members.

11. A pair of mower deck lifting ramps comprising:
    a pair of tire supporting members mounted to a top surface of a mower deck and supporting a pair of tractor tires to ride over a plurality of belts and pulleys on one side of the deck, each tire supporting member having a front sloping surface, a rear sloping surface, and a center portion between the front and rear sloping surfaces;
    a first carrier engagement member and a second carrier engagement member on each of the pair of tire supporting members;
    each of the first carrier engagement members engaging an upper part of a carrier attached to a lift arm of a loader, and each of the second carrier engagement members engaging a lower part of the carrier to raise and turn the mower deck.

12. The pair of mower deck lifting ramps of claim 11 wherein the first carrier engagement member is a rear facing hook.

13. The mower deck lifting ramps of claim 11 wherein the second carrier engagement member is a tapered pin.

14. The mower deck lifting ramps of claim 11 wherein the first carrier engagement member is attached to a front mounting portion of each tire supporting member, and the second carrier engagement member is attached to a rear mounting portion of each tire supporting member.

15. The mower deck lifting ramps of claim 11 wherein the first engagement member engages a rod on the carrier and the second engagement member engages a mounting hole on the carrier.

\* \* \* \* \*